W. R. Knowles,

Trace Buckle.

No. 99,914.        Patented Feb. 15, 1870.

Witnesses:
G. Mathys
F. W. Dow

Inventor:
William R. Knowles,
by
B. F. James,
his Attorney

United States Patent Office.

WILLIAM R. KNOWLES, OF COLUMBIANA, OHIO.

Letters Patent No. 99,914, dated February 15, 1870.

IMPROVED TRACE-BUCKLE FOR HARNESS.

The Schedule referred to in these Letters Patent and making part of the same.

*To all whom it may concern:*

Be it known that I, WILLIAM R. KNOWLES, of the town of Columbiana, and State of Ohio, have invented a new and useful Improvement in "Harness-Buckles;" and I do hereby declare the following to be a full, clear, and exact description of the construction and operation of the same, reference being had to the accompanying drawings making a part of this specification, in which—

Figure 1:
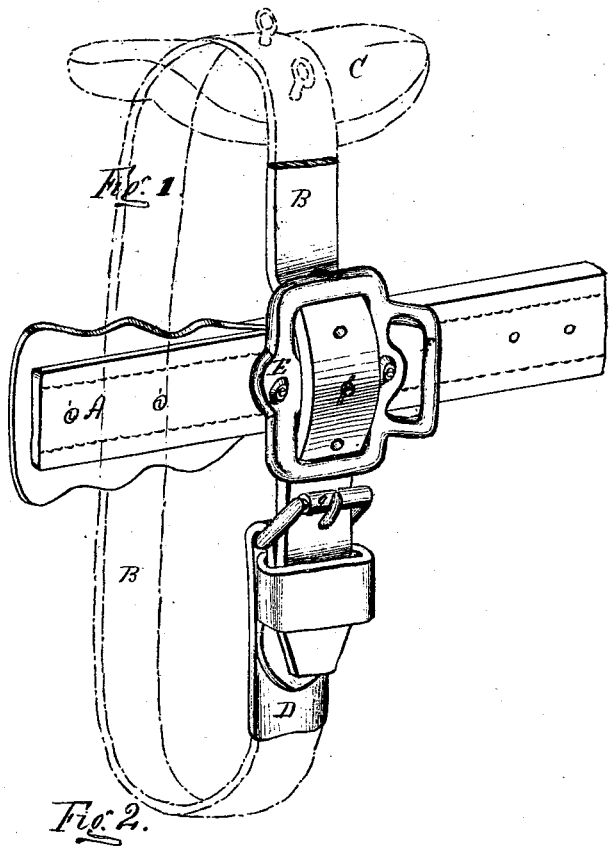
Figure 2:
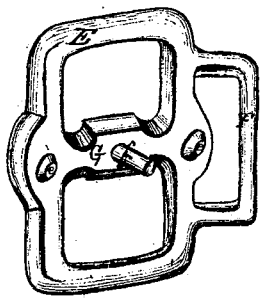

Figure 2 represents the buckle, and
Figure 1, the application of it to the harness.

The nature of my invention consists in the construction of a metallic buckle in one piece, that admits of easy application to the harness, and by its use great economy is found to exist in the saving of leather.

To enable others skilled in the art to make and use my invention, I will proceed to describe it.

This buckle may be constructed of cast or malleable iron, or other metal, in one piece, and in the form shown in fig. 2 of the drawings.

E represents the buckle.

F, a loop formed upon the rear end of the same, through which the breeching-strap may pass.

*f* is a tongue projecting from the cross-plate G of the buckle; and

*e e* are holes made in the buckle, through which the rivets are placed when it is applied to the traces of the harness and fastened to the same, as seen in fig. 1.

A represents a portion or one part of a trace, the same being attached to the hames in any usual manner, at or near the holes *i i*.

C represents the saddle-pad, and B the saddle-strap. This strap is continuous around the body of the horse, forming, at the same time, supports for the traces when connected with the buckle, and also a belly-band, as shown in fig. 1.

It will be observed that the leather portion of the harness is connected in no other way to this buckle than by means of the rivets referred to and the tongue of the buckle; consequently there are no bends or loops required to be formed in the leather, and the labor of sewing or stitching such bends or loops entirely dispensed with.

By this mode of constructing a buckle, from six to eight inches in length of leather is saved in each single harness, thus, taking the aggregate number of harnesses manufactured, it can be easily demonstrated that the saving in material and labor amounts to a very large sum of money within a given period.

I am aware that patents have been already issued for buckles that in their general appearance seem to embrace some of the features claimed by me as my invention, but a careful inspection of them will make it apparent that they do not show or claim the improvement herein described by me. I therefore disclaim the inventions described and shown in the patents of George P. Coles, H. Hise, G. M. Harnish, and H. S. Woodruff.

What I do claim as my invention, and desire to secure by Letters Patent, is—

The construction of a metallic harness-buckle in one piece, with only a top, bottom, and back loop, when riveted to the trace or traces, and having formed upon it a cross-bar containing a pivot or tongue to enter into a saddle-strap, in the manner and for the purpose herein described.

WILLIAM R. KNOWLES.

Witnesses:
JOSIAH ROHRBAUGH,
H. N. GATES.